United States Patent [19]
Woody

[11] Patent Number: 5,802,704
[45] Date of Patent: Sep. 8, 1998

[54] HOOPING MACHINE

[76] Inventor: D. Scott Woody, 455 Kittridge Dr., Midvale, Utah 84047

[21] Appl. No.: 312,510
[22] Filed: Sep. 26, 1994
[51] Int. Cl.$^6$ ..................................................... B23P 19/02
[52] U.S. Cl. .............................. 29/708; 29/252; 29/281.5; 29/721; 192/132
[58] Field of Search .............................. 29/251, 708, 252, 29/281.5, 720, 721; 269/287, 909; 192/130, 132

[56] References Cited

U.S. PATENT DOCUMENTS

| | | |
|---|---|---|
| 4,280,610 | 7/1981 | Meacham ................................. 192/132 |
| 4,391,358 | 7/1983 | Haeger ................................. 29/708 X |
| 4,561,177 | 12/1985 | Rancer . | 
| 4,586,248 | 5/1986 | Ho ............................................ 29/708 |
| 4,694,671 | 9/1987 | Downham ............................. 29/708 X |
| 4,698,905 | 10/1987 | Taga ...................................... 29/708 X |
| 4,805,297 | 2/1989 | Seneff ................................... 29/251 X |
| 5,432,990 | 7/1995 | Seneff ...................................... 29/251 |

OTHER PUBLICATIONS

Jumping Through Hoops, Stitches Magazine/May 1994, pp. 132–144.
Pneumatic Hooping Machine Increases Efficiency, Embroidery Business News, Feb. 12, 1994, p. 12.
Air–Mite, Pneumatic Automation Components, parts list.

Primary Examiner—Joseph M. Gorski
Attorney, Agent, or Firm—Workman, Nydegger and Seeley

[57] ABSTRACT

A safe, efficient hooping machine preferably driven by pneumatic power comprising an adjustable hoop push plate, an angle head which is for inserting an inner ring into an outer ring and a safety feature which allows hoopers to keep their hands from becoming seriously hurt when a hooping ram is lowered.

60 Claims, 10 Drawing Sheets

HOOPING MACHINE

BACKGROUND

1. Field of the Invention

This invention relates to machines which can be used for framing fabrics or material into corresponding male and female hoops as support members (a process known as "hooping"), the members maintaining a portion of fabric in a stretched, taut position. After an individual hoops a piece of fabric or material (the individual is known as a "hooper,") the hooped fabric or material can then be placed into an embroidery machine and mechanically embroidered. Many embroidery machines use multiple sets of hooped materials or fabrics in order to increase the speed, efficiency, and productivity of embroidery.

Hooping machines generally insert one ring of an embroidery hoop set into alignment with another ring corresponding to the hoop set. Hoops are common to the embroidery industry and hold fabric or other flexible material between them by friction of the two rings. The connected rings which hold the material or fabric between them can be attached to an embroidery machine.

2. Prior Art

Due to the mechanics of the hooping process, a pneumatic-operated hooping machine has proven to be a useful and efficient device, as opposed to mechanically operated models. The prior art teaches the use of a push plate which lowers hoops straight down onto corresponding hoops. Many hoop sets, however, cannot be readily meshed with a push plate lowering straight down onto a corresponding hoop. Irregular shaped hoop sets and larger hoop sets are particularly difficult to mesh using a straight downward approach.

The present invention teaches the use of a spring-loaded adjustable push plate which can initially lower one side of a first hoop into a second hoop, then cause the remainder of the first hoop to be lowered in the second hoop, following the contours of the second hoop.

Pneumatic hooping machines, however, can be dangerous due to the high pressures associated with pneumatic rams. The prior art has failed to successfully address and overcome the problems associated with the potentially serious injuries to hoopers fingers and other appendages. Fingers can readily become pinched between plates to be meshed. In light of the high pressures necessary to mesh hoop sets, there is a serious need for safety features associated with pneumatic rams.

The inventor has invented a pneumatic hooping machine which has a unique two-stage safety process protecting users of the pneumatic machine from seriously injuring a finger while using the machine. The novel safety system includes a two-way valve which can be activated by a low pneumatic pressure to combine with a high pneumatic pressure generating the force necessary to combine the inner and outer rings. The safety feature is connected to a foot operated pneumatic unit, providing both convenience and safety.

Other novel features of the invention include the many different modular parts which uniquely enhance the hooping experience. There are also many miscellaneous safety features associated with this new device.

BRIEF DESCRIPTION OF THE DRAWINGS

In order that the manner in which the above-recited other advantages and objects of the invention can be appreciated, a more particular description of the invention briefly described above will be rendered by reference to a number of specific embodiments which are illustrated in the appended drawings. Understanding that these drawings depict only typical embodiments of the invention and are not to be considered limiting in scope, the invention will be described and explained with additional specificity and detail through the use of the accompanying drawings in which:

FIG. 6 features the angle head in a horizontal position while FIG. 7 features the angle head in an angled position.

BRIEF SUMMARY AND OBJECTS OF THE INVENTION

Figure 1:
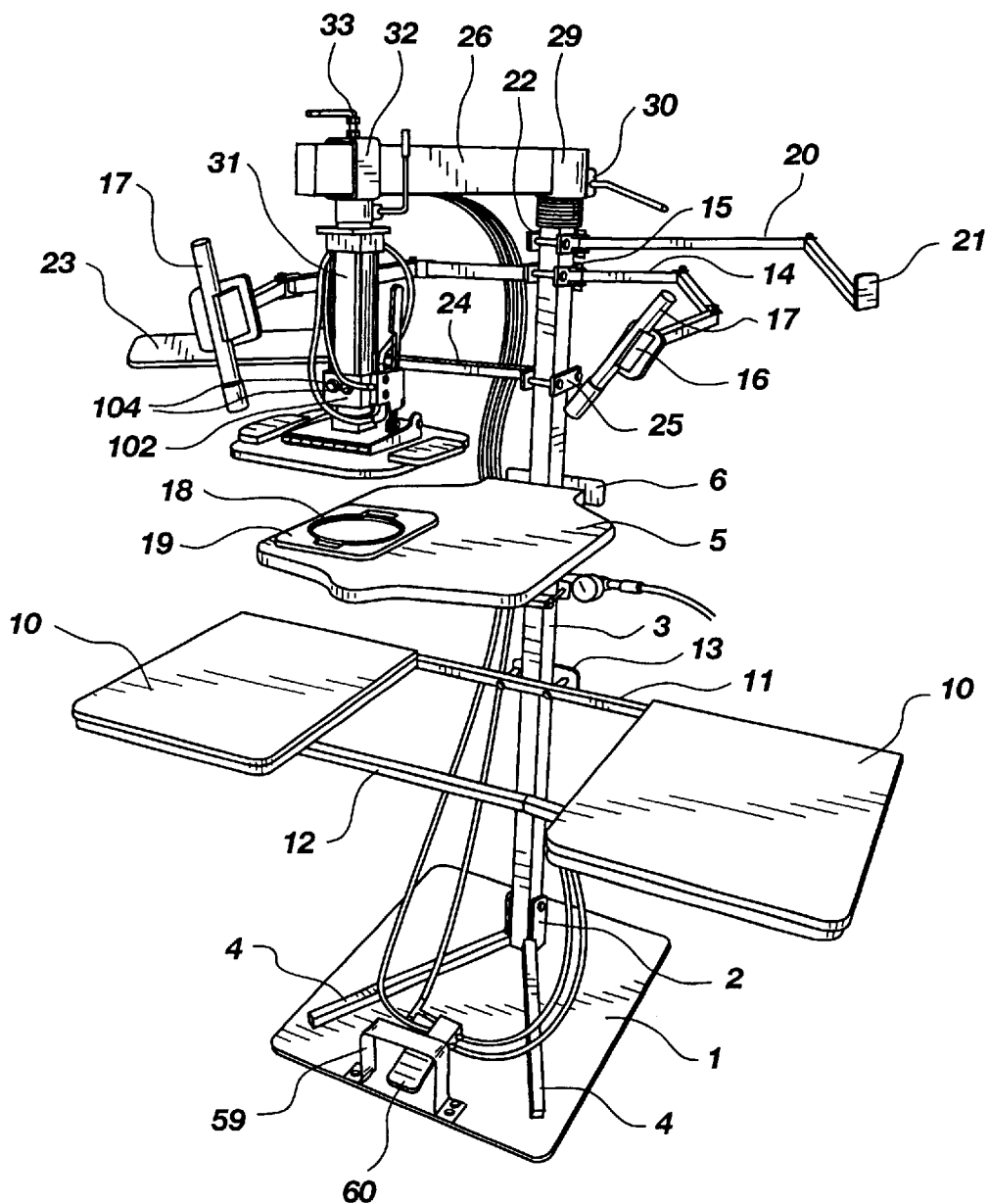
FIG. 1 is a perspective view of the preferred embodiment of the present invention.
Figure 2:
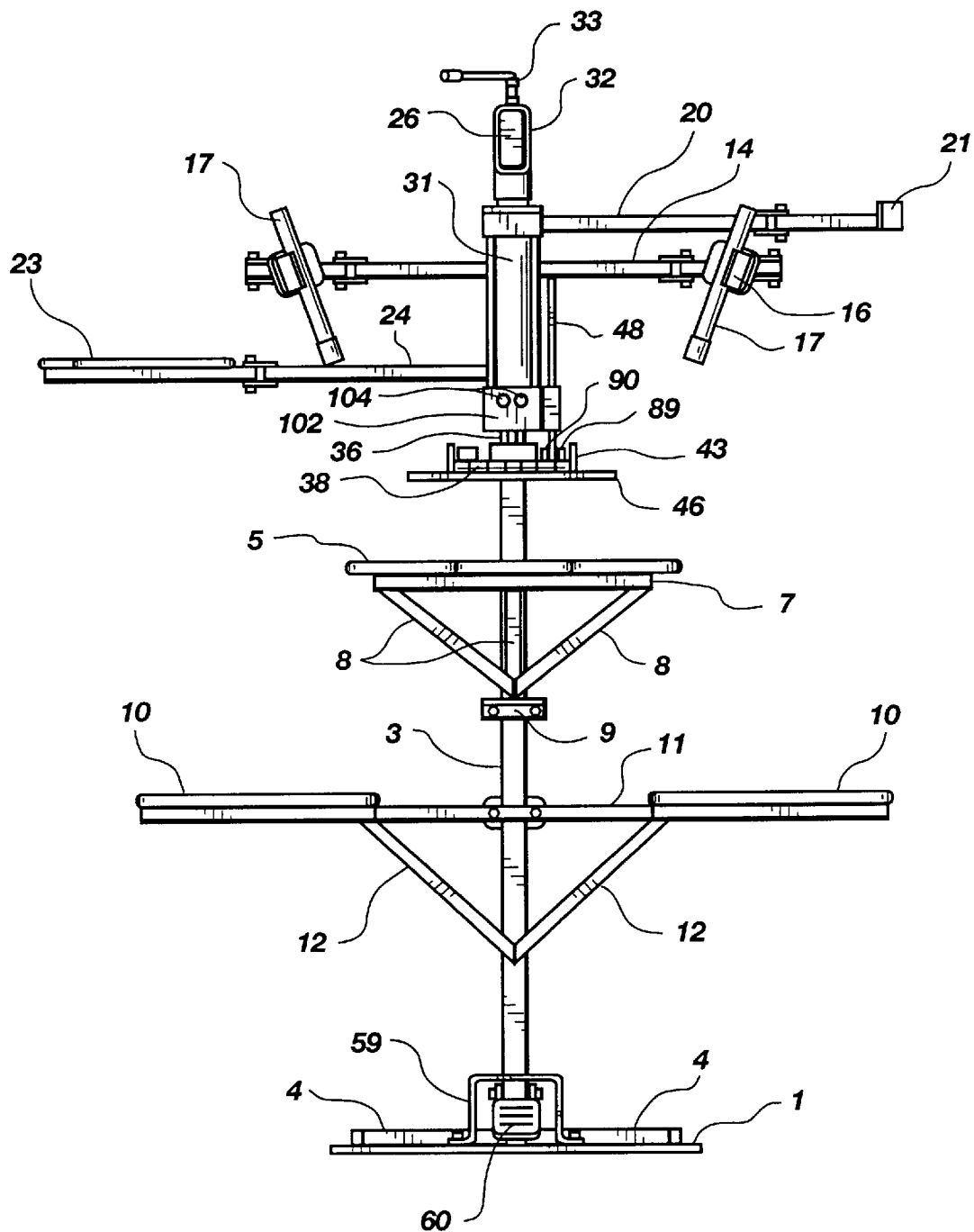
FIG. 2 features a front elevation of the preferred embodiment of the present invention.
Figure 3:
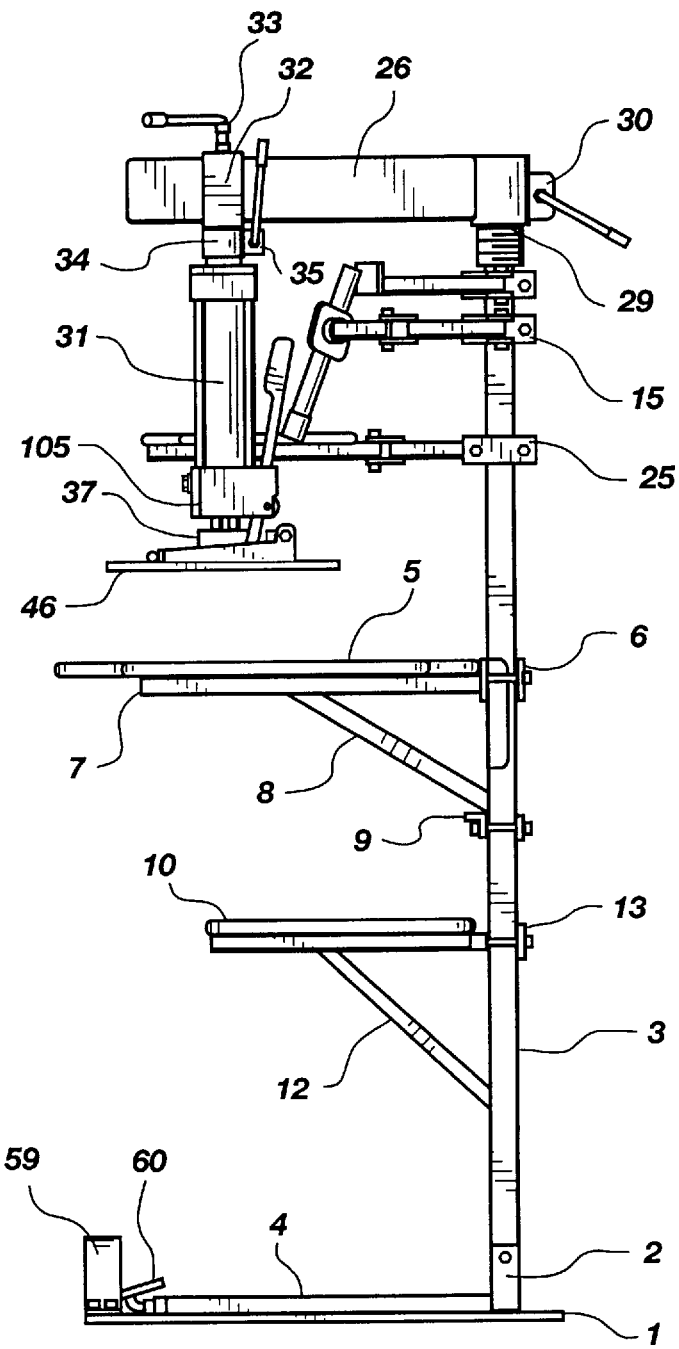
FIG. 3 features a side elevation of the preferred embodiment of the present invention.
Figure 4:
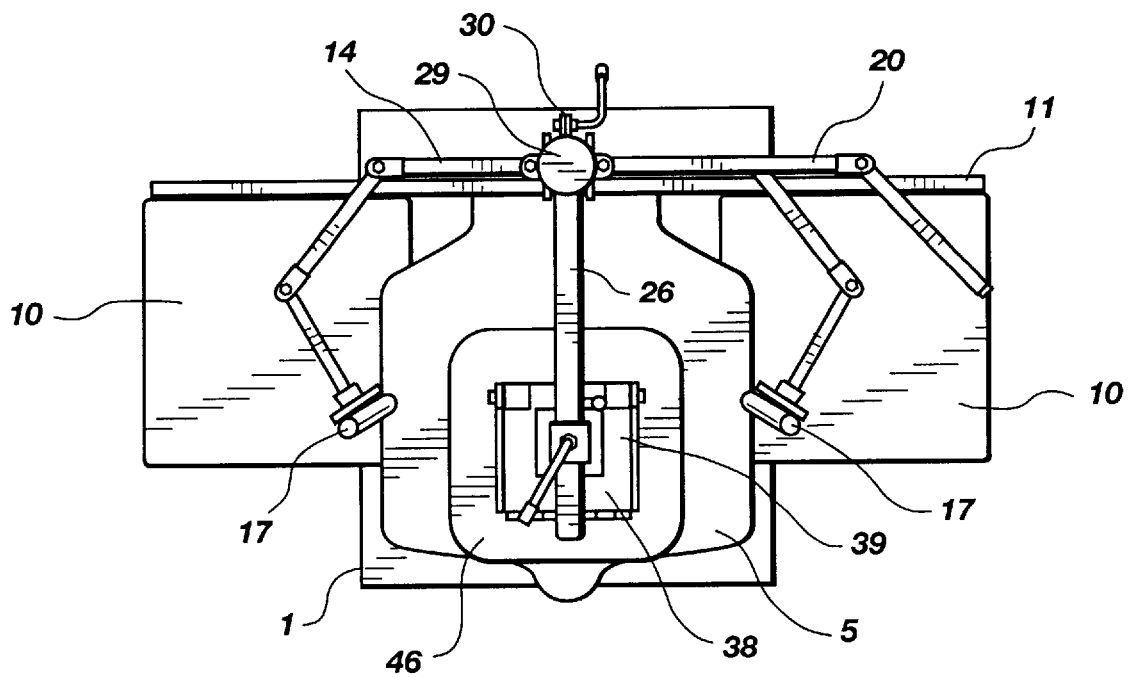
FIG. 4 features a top plan of the preferred embodiment of the present invention.

The objects of the present invention are:

1. To create a hooping machine operated by pneumatic devices.

2. To create a pneumatic hooping machine wherein the pneumatic machines are run by a spring loaded foot driven pedal.

3. To create a pneumatic hooping machine wherein different speeds of pneumatic pressure are used in combination to create a pressure system which both operates the hooping function and features a safety mechanism.

4. To create a pneumatic hooping machine featuring a push plate connected to an angle head whereby a first hooping ring is initially pushed into alignment with a portion of the second ring and is then pushed into alignment with the remainder of the ring.

5. To create a pneumatic hooping machine which features a variety of interchangeable parts which can be modulated.

6. To create a pneumatic hooping machine featuring a non-rotatable pneumatic cylinder.

7. To create a pneumatic hooping machine featuring an automatic oiling system and a system for collecting the oil after oil and air are exhausted.

8. To create hooping tables which fit various kinds of material or garments and are supported by members which fit in with the hooping table and do not tear, rip, or mangle garments when garments are placed on the hooping table.

9. To create a pneumatic hooping machine featuring a guidance device for the accurate placement of articles or fabrics on the hooping table.

10. To create a pneumatic hooping machine in which the ram, the pneumatic cylinder, the horizontal member, the vertical member, the hooping table, and the arm containing the guidance device are adjustable, replaceable, and modulatable.

11. To create a pneumatic hooping machine comprising convenient side tables and arms for placing articles of clothing, binding fabric, and/or hoops on while working on the machine.

12. To create a check valve system wherein a high pressure is sent through a regulator creating a high pressure and a low pressure and the high pressure is preventing from returning through the check valve.

13. To create a pneumatic hooping machine wherein various kinds of push plates can be used in conjunction with various kinds of alignment rings which can in turn be used in combination with various kinds of hooping tables.

14. To create a pneumatic hooping machine which can be used in combination with various push plate attachments for holding an inner hoop in place until the inner hoop is combined with the outer hoop.

15. To create a pneumatic hooping machine featuring an angle-head which is spring loaded.

As the ram bar is extended towards the hooping table with a lower, safer air pressure, a cam actuates a valve assembly, sending a higher air pressure to the ram. The cam and valve mechanism is designed such that when the angle head meets with no interference, the safety mechanism allows a higher pressure to enter into the cylinder forcing the piston down at a high pressure and placing an inner ring into an outer ring resting in a hoop alignment mechanism. As the two hoops mesh, the flexible item between them is trapped by friction.

Another unique feature of the preferred embodiment of the machine includes that the hoop push plate has the ability to be moved to any location on the table that is being used, allowing for greater flexibility of locations and items to be hooped. Preferably, the push plate can be rotated 360° allowing hoops to be set at any rotation angle.

The other item setting this machine apart is the angle head. An angle head is particularly effective on larger or irregular shaped hoops. By employing the angle head, one end of the inner ring is inserted into the outer ring first. As the push plate travels closer to the table, the angle head springs are compressed causing the inner hoop to follow the edges of the outer hoop until the two hoops are brought into alignment. This allows for smoother insertion of the rings with less possibility of damage to items being hooped.

Because the machine is actuated by a foot valve, another unique item is the safety feature to keep hands from being seriously hurt. Because the ram is lowered with low pressure, anything preventing the travel of the ram will also prevent the actuation of the high pressure valve.

If the angle head meets an object, such as a finger, the low pressure continues pinching the object until the foot pedal is released. However, the actuating mechanism is not activated. Therefore, the high pressure system is not activated and the object is not seriously damaged. In the case of a finger, the finger may be pinched, but the air pressure can be adjusted so that the finger will not be broken. When the angle head meets with no resistance, the angle head continues into the alignment ring placing an inner ring into an outer ring and hooping a material or fabric.

The components in the most basic pneumatic hooping machine invented may be connected through a variety of devices. They may be welded together, or they may be connected through a variety of detachable mounting mechanisms. Furthermore, many other components may, and in the preferred embodiment are, added. One of the hallmarks of the preferred embodiment of the invention is its versatility and the ability of the user to interchange parts and to use or take off various parts as may be necessary under the circumstances.

The present invention describes a pneumatic hooping machine which features various devices which, in combination, act to create a unique, valuable, and highly marketable pneumatic hooping system. While the preferred embodiment contains many, if not each of the devices described, the most basic pneumatic hooping machine can be used without many of the devices disclosed.

The push plate is secured to the ram for receiving and maintaining a first hoop in a desired set position. A hooping table is mounted to the support frame, the hooping table being adapted to receive and maintain a second corresponding hoop in a desired set position.

DETAILED DESCRIPTION OF THE PREFERRED EMBODIMENT

The pneumatic hooping machine is comprised of a horizontal floor member, known as a base plate 1, having a bottom side and an upper side, the bottom side of which rests on the floor and the upper side of which is mounted to a vertical support member 3. The vertical support member is comprised of a bottom end, a top end which may be and is preferably threaded with at least one thread (and most preferably one), and a middle portion.

The bottom end of the vertical support member 3 is mounted to the upper side of the base plate 1. One skilled in the art will recognize that the vertical support member may be mounted to the upper side of the base plate through a variety of mounting mechanisms. The vertical support member 3 may be welded or detachably mounted through a detachably mounted attachment mechanism.

For purposes of this specification, the term "mount" or "mounted" shall comprise various mechanisms through which components are connected, such as (1) welding the two components together, (2) detachably mounting the components through the use of a detachably mounted attachment mechanism, (3) soldering, and (4) other devices for mounting known in the art. Mounting mechanisms shall comprise welded edges of the components to be connected together, and detachably mounted attachment mechanisms. Detachably mounted attachment mechanisms shall be known as (1) brackets used in combination with nuts and bolts, screws or pins, (2) screws, (3) nuts and bolts, (4) pins, (5) roll pins, (6) clevace pins, (7) split pins, (8) joints, or many other detachable mounting mechanisms commonly used in the art.

The preferred mounting mechanisms connecting the vertical support member 3 to the base plate 1 comprise a support bracket 2 which is welded to a plurality of supporting base plate members 4 and is attached to the vertical support member 3 using a plurality of bolts inserted through ring-shaped portions of the a first side of one bracket defining a hole and through a corresponding ring-shaped portion of the vertical support member defining a hole and connected to a nut on the outside of a second support bracket, as shown in FIG. 1.

Throughout this entire specification and the appended claims, the word "proximal" shall mean closest to the vertical support member, while the word "distal" shall mean furthest away from the vertical support member.

To the middle portion of the vertical support member is mounted at least one outwardly extending horizontal table used for hooping and known as a hooping table 5. The hooping table is comprised of a lower face, an upper face, a distal end, and a proximal end. The distal end of the hooping table 5 is mounted on the vertical support member 3. It may be welded or detachably mounted and in the preferred embodiment is detachably mounted on the vertical support member by using a detachably mounted attachment mechanism 6. The detachably mounted attachment mechanism may comprise a variety of attachments which are commonly known to one skilled in the art, but preferably comprises a bracket opposite the vertical support member from the hooping table having a plurality of ring-shapes, each ring-shape defining a hole therethrough. Bolts are inserted through the ring-shapes into an internal nut within a framework 7 supporting the table.

Many different frameworks are possible. In the preferred embodiment, at least one upwardly extending hooping table support member, (and most preferably, three support members) is mounted, at its proximal end, below the hooping table to the vertical support member 3 and at its distal end to the framework 7. The hooping table 5, the framework 7 and the upwardly extending hooping table support members 8 are designed to allow a hooper to readily slide an article or fabric over them without tearing or ripping the fabric on the table, framework or support structures.

Figure 14:
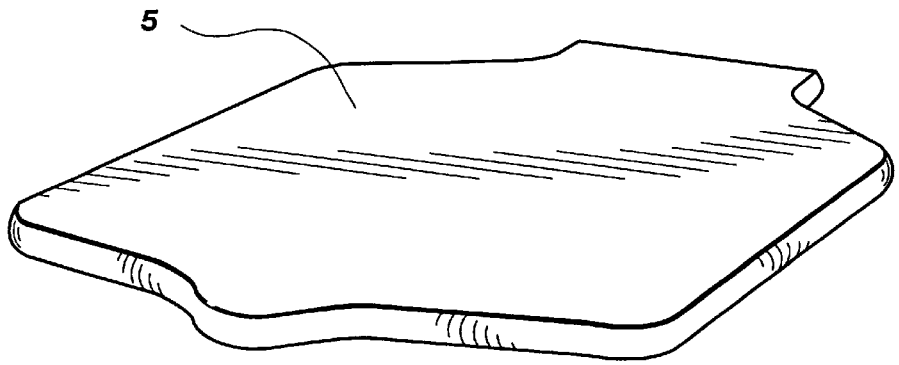
FIG. 14 features a push plate which has been invented specifically for use with garments such as shirts and jackets which have a ring shape defining a hole through which wearers place their head and arms. The push plate is beveled and simulates the shape of a head and shoulders.

Many different tables can be used. The table 5, also shown in FIG. 14, is preferred for applications involving a head and shoulders portion of a garment or article. The table 5 may be used advantageously with garments such as shirts and jackets which have a ring shapes defining a hole therethrough which wearers place over their head and arms. The table 5 is beveled and simulates the shape of a head and shoulders. Thus, the table comprises a hooping table having a rounded, beveled protuberance in the distal end which tapers proximally in an asymmetric pattern, substantially simulating the pattern of a head and shoulders. The form fitting shape is specially contoured to such garments as T-Shirts and Sweatshirts which may be placed so that one side of the garment is over the table, ready to be hooped and the other side of the garment is under the table. Another possible table may be a thinner sleeve table, formed in a rectangular shape with a curved distal end.

In addition, an upwardly extending hooping table support member bracket 9 may be, and in the preferred embodiment is, employed so that a person can readily replace the table in use at a particular time without encountering difficulties in setting the height of the table, assuming a similar height frame is employed, and without readjusting the height of the ram 31.

Also in the preferred embodiment, additional components are attached to the vertical support member. For example, an accessory table 10, or preferably a plurality of accessory tables may be attached to the vertical support member, preferably supported by an accessory table support member 11 and upwardly extending accessory table support members 12, the accessory table support member being detachably mounted by using a detachably mounted attachment mechanism 13 in a horizontal position to the vertical support member, as shown in FIGS. 1–4. As many accessory tables as are necessary may be added, providing there is sufficient space for a hooper to stand near and operate the machine.

In addition, the preferred embodiment of the invention comprises at least one alignment arm 14 mounted detachably, at its proximal end, to the vertical column through the use of an guidance arm attachment mechanism, such as a detachably mounted attachment mechanism. The distal end of the arm comprises a plurality of gripping members 16.

The gripping members 16 hold a guidance device 17. By using a guidance device, articles of clothing or other fabrics which need to be embroidered in a uniform place in the garment or fabric can be mounted over the hooping table in a uniform position, guiding the hooper in placing the article in a uniform position in relation to the push plate 46.

The alignment arm 14, which preferably is comprised of three pivotable joints within the middle portion of the arm and one rotating joint located at the proximal end, can be adjusted to center a ray or beam of light onto a common landmark on the article or fabric, such as a zipper or a pocket corner. By centering at least one and preferably two guidance devices over at least one and preferably two landmarks in the transparent push plate and on the article of clothing or fabric, numerous articles of clothing can be placed in the same position on the hooping table, allowing a hooper to place the hoop in the same or essentially the same place on each article of clothing. This is particularly useful when using multiple hooped articles on automatic embroidery machines.

The preferred guidance device comprises a laser. Other guidance devices may comprise overhead projectors, flashlights, a light bulb, other sources of light known in the art, or other devices such as a wire or a scope.

A push plate 46 may, and in the preferred embodiment is used, and is preferably made of a transparent plastic (to shine a laser through), most preferably an acrylic sheet. The push plate 46 holds a first hoop 86 and pushes the first hoop 86 into alignment with a second hoop 18 which is resting in a hoop alignment mechanism 19, which may be and is preferably used in the present invention.

An outer hoop corresponds to an inner hoop, forming a hoop set. The two hoops are aligned or brought into alignment when the inner hoop is placed inside the outer hoop or the outer hoop is placed outside the inner hoop. When aligned, the inner hoop fits within the outer hoop and the article or fabric to be hooped rests within the two hoops. While an outer hoop may be placed on the push plate and lowered into an inner hoop, preferably, an inner hoop is placed on the push plate and lowered onto an outer hoop. Thus, the inner hoop preferably constitutes the first hoop 86.

The first hoop may be attached to the push plate through a variety of hoop securing devices, the devices comprising a screw, a spring loaded detente pin, a dowel pin, a magnet, double-sided tape, glue, a spring-loaded button, mounted onto a protuberance on the push plate which presses into an indentation in the hoop or hoop flange 97, or through a ring shaped member defining a hole in the hoop flange 97 or other securing devices.

Push plates existing in the prior art have been adapted to fit a single ring. In order to fit a certain ring, the push plate is beveled edges or a recess is cut fitting the contours of the hoop. These other push plates feature the use of a friction fit. In other words, prior art push plates are contoured to frictionally fit a single hooping ring; the shape of the push plate is molded around the hoop. Thus a new push plate must be used for each hoop.

Figure 11:
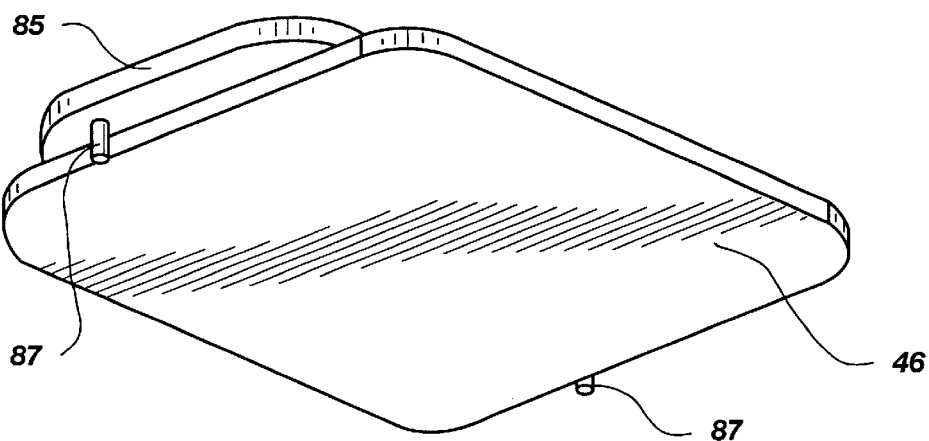
FIG. 11 features a preferred push plate which is connected to lower plate of the angle head. The push plate receives and maintains a hoop to be placed on a corresponding hoop which rests on the hooping table.

One of the push plates invented by the inventor and disclosed in FIG. 11 can receive various kinds of hoops without having to use a new push plate. This unique feature is performed through the use of at least one and preferable two gripping members 85 and a securing device attached to the gripping member(s). Thus, rather than using a push plate which is molded to grip the hoop frictionally, the hoop is attached with a hooping flange holding pin 87, the pin comprising a screw, a spring loaded detente pin, a dowel pin, or a spring-loaded button which presses into an indentation in the hoop or hoop flange 97, or through a ring shaped member defining a hole in the hoop flange 97 or other securing device well known in the art.

The hooping flange holding pin 87 is preferably a missile shaped pin which is smaller on the bottom portion and is larger towards the top.

When using a high pressure source, such as a pneumatic ram, it is generally helpful and preferred to create a push plate which pushes, as much as possible, on the ring, rather than on the supporting flange structures 97 often accompanying rings. Placing the pressure on the ring, rather than the flange, prevents the ring or flange from splitting or breaking. In the most preferred mode, pressure from the push plate should be placed evenly on the ring and the supporting flange 97.

The gripping mechanism 85 is designed to attach to various kinds of supporting flanges. For example, the push plate gripping mechanism 85 may attach to the supporting flange 97 disclosed in FIG. 12 through the use of a hoop flange holding pin such as a dowel pin. Similarly, other holding pins may be used as is well known in the art.

Figure 12:
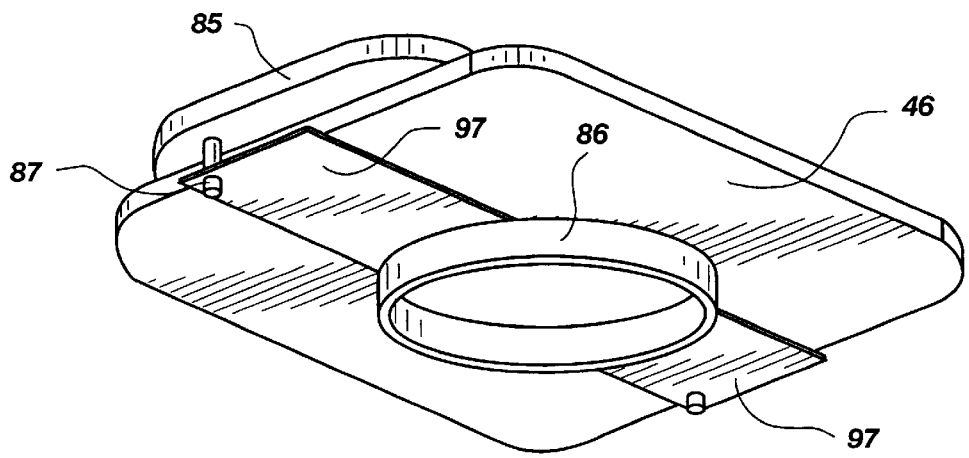
FIG. 12 features an inner hoop connected to the push plate.
Figure 13:
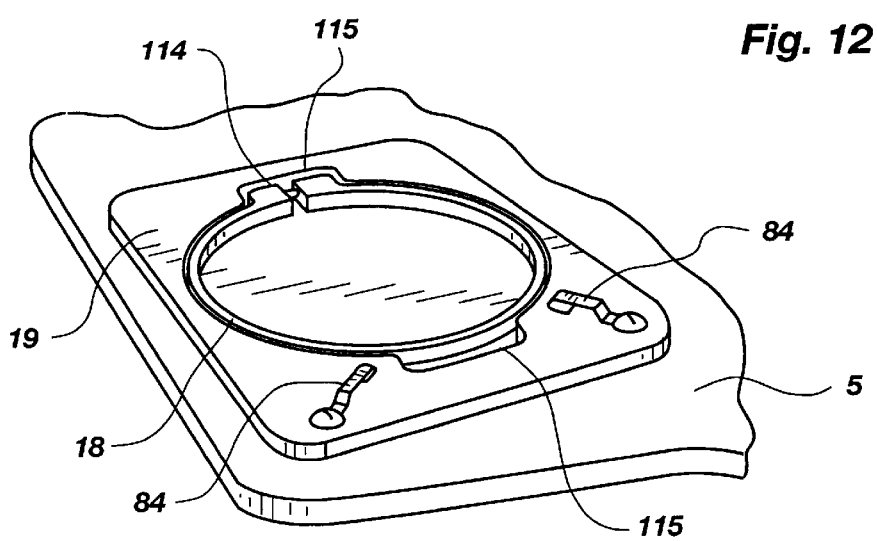
FIG. 13 features a hoop alignment mechanism connected to the upper surface of a hooping table.

Certain supporting flanges further comprise secondary flanges which closely fit into and extend upwardly into the contours of the push plate gripping mechanism 85 and the neighboring side of the push plate. Because the hoop flange holding pin 87 can extend both into flanges which do not closely hug the gripping mechanism and flanges 97 which do not tightly grip the walls of the push plate, as seen in FIG. 12, the push plate disclosed in FIG. 11 is a unique and novel contribution to the art.

The push plate disclosed can attach to rings comprising such secondary flanges, as well as rings not comprising such secondary flanges. Thus, the push plate disclosed in FIG. 12 is an example of a push plate which can be used with various hoops, rather than merely one hoop.

Another feature which is not necessary, but is within the preferred embodiment of the invention, is a hoop arm 20 comprising a proximal end connected to the vertical support member 3 by a hoop arm attachment mechanism and, at the distal end, a hoop arm lip 21. The hoop arm attachment mechanism may be comprised of a detachably mounted attachment mechanism. Using the lip 21, the hoop arm, which preferably is comprised of at least one rotating joint at its proximal end, may be used to conveniently hold items such as a hoop or hoops, or articles of clothing or pieces of fabric, or other supplies or equipment.

A rotatable accessory table 23 may, and in the preferred embodiment is used. The distal end of a rotatable accessory table support member 24 is connected to the table while the proximal end of the rotatable accessory table support member 24 is detachably connected to the vertical support member 3 through the use of a rotatable accessory table support member clamp (a single proximal rotating joint) 25, which may comprise a detachably mounted attachment mechanism. The clamp 25 connects to the vertical support member and connects to a rotating joint which connects to the rotatable accessory table support member 24.

A horizontal beam 26 is disclosed, comprising a distal end, a middle portion and a proximal end. The under side of the proximal end preferably defines a hollow recess and is preferably threaded with a plurality of threads, most preferably two. The horizontal beam is attached at its proximal end to the top end of the vertical column, preferably by threading at least one thread on the vertical support member into the plurality of threads on the horizontal beam, forming a first swivel joint 29.

The first swivel joint 29 may, and in the preferred embodiment does, allow the horizontal beam 26 to swivel at least 180°. A locking mechanism 30 may be, and preferably is, attached to the first swivel joint 29 preventing the first swivel joint 29 from moving during the use of the machine.

A pneumatic ram 31 is disclosed, comprising a top end, a middle portion and a bottom end. The ram 31 may be mounted at its top end to the distal end or middle portion of the horizontal member 26, as may be necessary, depending upon the article to be hooped. The ram 31 may be attached to the horizontal member through welding or through a detachably mounted attachment mechanism.

In the preferred embodiment, the ram is attached to the horizontal member through the use of a collar 32, the collar 32 comprising an inner portion, an outer portion, an a lower threaded surface 34. The inner portion of the collar slidably surrounds the horizontal member 26 having the ability to slide from the proximal end of the horizontal member to the distal end of the horizontal member.

Preferably, the collar 32 contains a collar locking mechanism, known as a first locking mechanism, 33 to prevent the sliding of the collar 32 during the operation of the machine. The upper surface of the ram 31 may be attached to the lower threaded surface 34 of the collar 32 if threads are welded into the upper surface of the ram, allowing the ram to rotate 360° on the threads.

Figure 15:
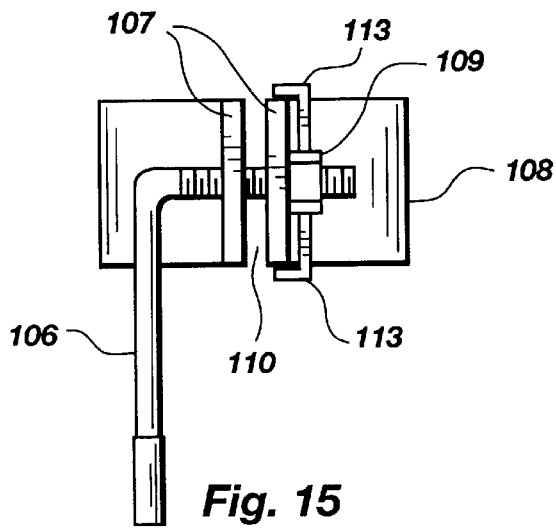
FIG. 15 features a locking mechanism which is typical of at least some of the locking mechanisms used on the preferred embodiment of the invention.

The lower threaded surface of the collar 34 may, and preferably does, comprise a lower threaded surface locking mechanism, known as a second locking mechanism, 35, shown in FIG. 15, to prevent movement of the ram 31 during operation of the machine.

The locking mechanism which may be used in multiple places on the machine in various embodiments is shown in FIG. 15 and comprises a compression locking bar 106, which compresses a joint, flange, thread, or series of threads, and preventing movement of the joint, flange, thread, or set of threads. A plurality of protrusions exist on a split member 108, such as the lower threaded surface 34 of the collar 32, which has a recess defining a slit 110 between one edge of the collar and another edge. One protrusion 107 exists on each side of the slit. The protrusions have corresponding ring shapes defining holes therethrough, through which the locking bar 106 is inserted. When the locking bar 106 reaches an external nut 109, the locking bar is threadably inserted into the nut 109. Gripping flanges 113 extending from the nut prevent the rotation of the nut after the gripping flanges 113 are lodged through rotation of the locking bar 106 against a protrusion 107.

The use of gripping flanges 113 on an external nut 109 is preferred on this invention to an internal nut because the nut may be turned an initial amount, no more than 180°, without turning the locking bar 106. This is advantageous because the many components on the machine often make it difficult to turn the locking bar 106, preventing rotation of the locking bar more than a slight distance.

The use of the collar 32, the first swivel joint 29 and the threaded surface 34 allows the ram to be moved, rotated and locked into many different places over the hooping table 5 and otherwise within the working area, increasing ease and flexibility of use.

The pneumatic ram 31 preferably comprises a non-rotating pneumatic bar 36. A rotating pneumatic bar is useful, particular if perfectly circular hoops are used. However, particularly when non-circular hoops are used, such as rectangular shaped hoops, a rotating bar may tend to rotate during the depression of the bar and before a first hoop 86 is joined with a second hoop 18, throwing the hoops out of alignment.

Thus, a ram comprising a single ram bar may be used without rotation if a device is used to prevent the single ram bar from rotating. A double ram bar 36 shown in FIG. 9 extended from the cylinder housing 76 is preferred because of its non-rotating features. Mounted to the bottom end of at least one ram bar is a mounting block 37, comprising a top and bottom end. An example of a preferred ram is the Non Rotating Rod Air Cylinder, Speed Aire, W. W. Granger, Lincolnshire, Ill.

In the preferred embodiment, the bottom end of the mounting block 37 is connected to an angle head 38, comprising a first plate 39 connected by its upper surface to the bottom end of the mounting block 37, a second plate 40, a hinge 41 connecting the top and bottom angle head plates at a front end, and a spring loading mechanism for spring loading the two plates 42 located near the rear end.

The first hoop may be attached to the bottom surface of this second plate 40 through a variety of hoop securing devices. The second plate thus becomes another embodiment of a push plate. However, connection of the hoop directly to the first plate is not preferred because of the transparent nature of the push plate and the hoop securing devices on the push plate. The top surface of the push plate 46 is preferably attached directly to this second plate 40.

The preferred spring loading mechanism 42 comprises at least one coil spring and most preferably, a plurality of coil springs. Other mechanisms include another small pneumatic ram, torsion springs, and extension springs.

The spring may, and preferably does, rest upon a spring seat member 93. Furthermore, the first plate 39 may, and preferably does comprise a spring tower 94 in which the spring loading mechanism 42 is compressed when the angle head 38 is completely lowered. Upon locking the second plate 40 to the first plate 39 or, alternatively, upon complete extension of the ram bar 36, the second plate 40 becomes flush with the first plate 39 and the spring loading mechanism 42 is compressed within the spring tower 94.

In the preferred embodiment, at least one side panel 43 (and most preferably two side panels 43) is mounted perpendicularly on the second plate 40, shielding the hooper from catching a finger or other appendage between the first plate and the second plate during operation of the machine. A rear panel 95 shields the areas surrounding the rear portion 96 of the angle head.

A stop 45 having a ring-shape and defining a hole therethrough may be comprised within the second plate 40. By inserting an angle head bolt 44 through the stop and into a nut, preferably an internal nut located inside the first plate 39, the range of motion of the spring loading mechanism can be reduced to a range pursuant to which the rear panel 95 covers the rear end of the first plate 96 at all times during the operation of the machine, preventing the operator from lodging a finger or other appendage between the rear panel 95 and bottom side of the first plate.

The safe, spring loaded, angle head 38 makes it possible for the first hoop 86, detachably mounted to the push plate 46, the upper surface of which is connected to the lower surface of the second plate 40, to contact the second hoop at an angle then flatten out as the angle head spring loading mechanism is compressed. The final result is that the first and second plates are flush to each other and flush to the table when the ram bar 36 is extended to its lowest position.

Figure 6:
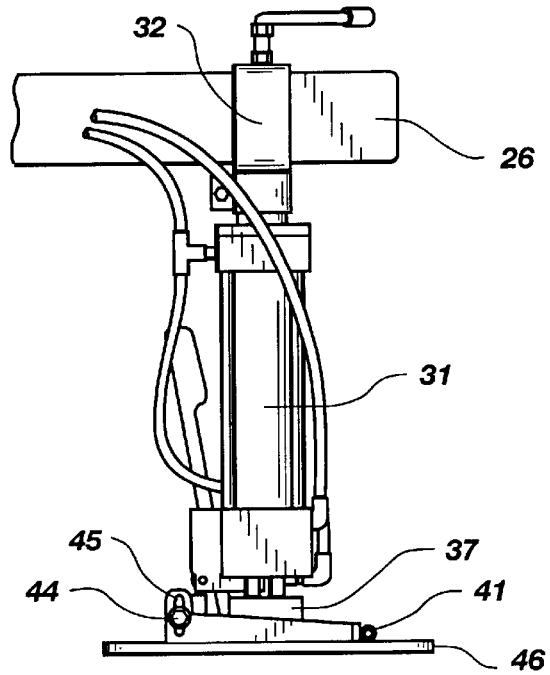
FIGS. 6 and 7 feature the ram in the preferred embodiment of the invention from a view opposite that of FIG. 5.

The angle head bolt 44 can also lock the angle head 38 into a position which is flush with the hooping table 5 and perpendicular to the vertical support member by pressing the second plate 40 into a position flush with the first plate 39 and tightening the angle head bolt 44, as is demonstrated in FIG. 6. Thus, the angle head may be lowered at a position which is flush with the hooping table, that is, parallel to the hooping table and perpendicular to the vertical support member.

In the alternative, the angle head may be lowered at an angle. When the angle head bolt is loose enough to allow the stop 45 to rotate or move, as in FIG. 7, the angle head can be lowered at an angle, as shown in FIG. 7, and the second plate then becomes flush with the hooping table when the angle head is fully lowered and the first hoop 86 is aligned with the second hoop 18.

Although the pneumatic hooping machine can be used without the angle head, i.e. through the use of a first plate connected to a push plate or a first plate connected directly to a first hoop, without the angle head, the first hoop must be lowered horizontally, which is less advantageous, particularly for irregular shaped hoops which are difficult to align with a corresponding hoop.

Figure 7:
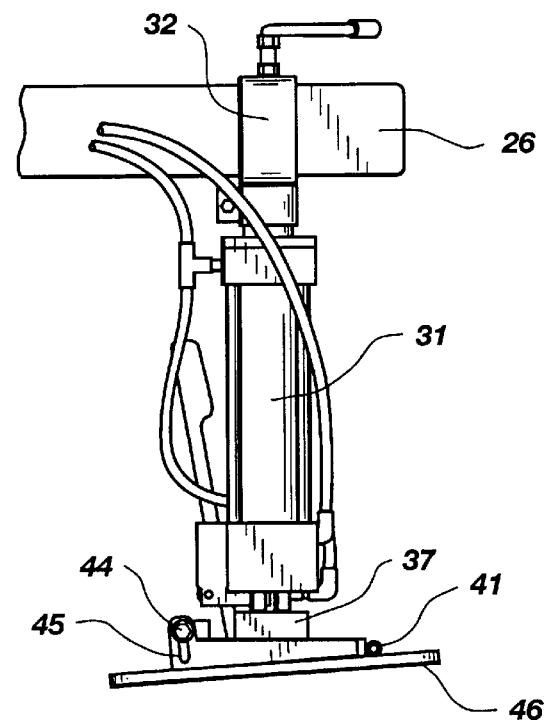

By using the angle head, shown in FIG. 7, the inner hoop may be initially lowered into a portion of the outer hoop, then lowered into the remainder of the outer hoop as the angle head is compressed, allowing the hooper to hoop with irregular shaped hoops.

Preferably, connected to the second plate 40 of the angle head 38 through the use of a push plate attachment mechanism, such as bolts, is the push plate 46. The preferred push plate 46 is equipped with internal threads in its upper surface, allowing one to bolt the push plate onto the second plate 40. The preferred first plate has four ring-shapes defining holes therethrough allowing the bolt heads connected to the second plate to rise through the holes in the first plate without preventing the first plate from becoming flush with the second plate when the angle head is compressed.

By using the moveable joints, swivels, and attachments described, the first hoop can be aligned while the second hoop is at any place on the table. The second hoop 18 may be resting on the hooping table 5 during the operation of the machine, but is preferably placed in a hoop alignment mechanism 22 which is attached to the table through the use of a variety of hoop alignment mechanism attachment devices, comprising a screw, a spring-loaded detente, a magnet, double-sided tape, glue, a spring-loaded button, a screw, a spring-loaded detente pin, or other devices. Two-sided tape is preferred as an attachment device because of the frequent changing of hoop alignment mechanisms, but other possible hoop alignment mechanism attachment devices include glue, screws, nuts and bolts, and other attachment devices which are well known in the art.

A hoop alignment mechanism constitutes a mechanism on the hooping table for readily holding a hoop in a set position on the table in preparation for precision alignment with a corresponding hoop. Various kinds of hoop alignment mechanisms are available. Many must be tailored to the hoop to be used. One feature relating to hoop alignment mechanisms invented by the inventor which can be used generically among with almost all hoop alignment mechanisms is a multilayered hoop alignment mechanism.

Figure 16:
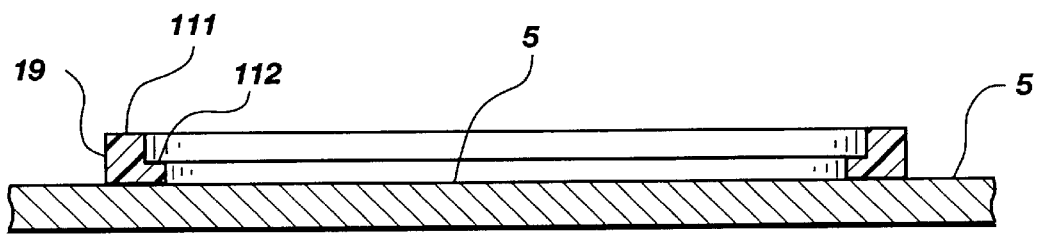
FIG. 16 features of cross section of a multilayered hoop alignment mechanism while FIG. 17 features a cross section of a multilayered hoop alignment mechanism with an outer hoop placed in the top layer.
Figure 17:
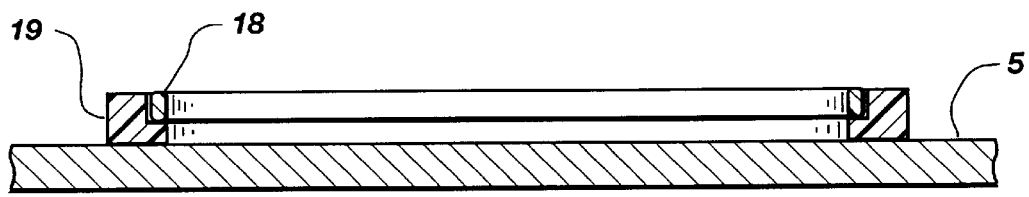
Figure 18:
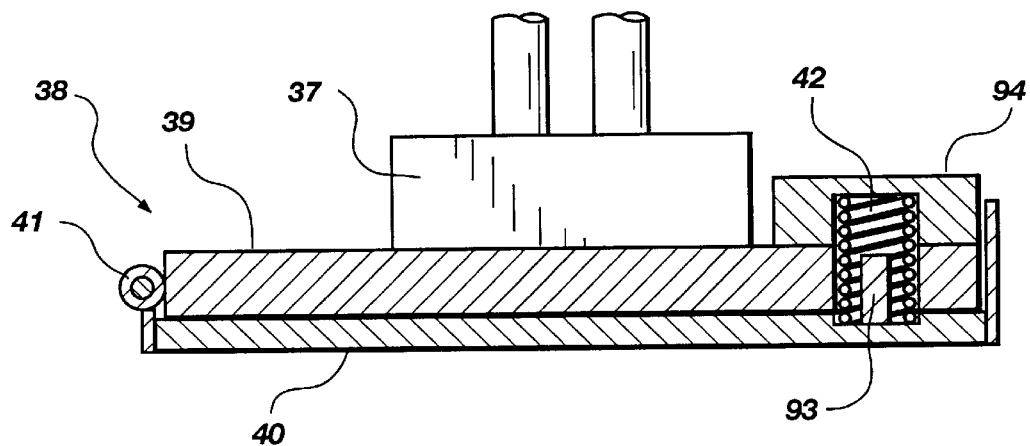
FIG. 18 features a cross section of an angle head in the horizontal position. In this position the angle head is flush with the hooping table.
Figure 19:
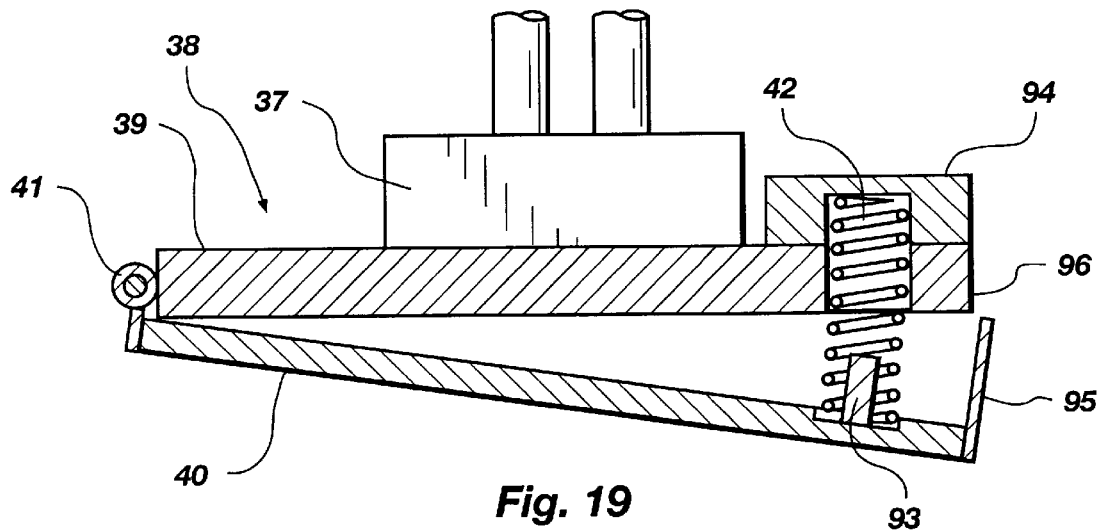
FIG. 19 features a cross section of an angle head in the angled position.

FIGS. 16 and 17 demonstrate an example of the multilayered hoop alignment mechanism in cross section. The lower edge 112, which is closer to the hooping table than the upper edge 111, runs throughout the inner surface of the hoop alignment mechanism, except where a notch 115 is made for removing the outer ring or for receiving a ring connection joint 114.

The lower edge 112 of the multilayered hoop alignment mechanism is useful, particularly when hooping thick materials such as sweatshirts. Hooping rings are the most effective at holding clothing or other material when then there is the greatest amount of friction between the rings, i.e. when the inner and outer ring are in perfect alignment.

When an outer hoop rests directly on the hooping table in a single-layered hoop alignment mechanism, and a backing fabric and the material to be hooped are layed over the hoop, the inner hoop is often prevented from coming into perfect alignment with the outer hoop because the material resting on the table prevents the inner hoop from going all the way down to the table, which is necessary to for the inner hoop to reach perfect alignment with an outer hoop resting on the table. The height of the backing fabric and material prevents the inner hoop from reaching perfect alignment with the outer hoop.

By using a multilayered hoop alignment mechanism, the innacuracy caused by single layered hoops is adjusted for. The backing fabric and material are compressed onto the hooping table, but the inner hoop does not need to proceed down to the hooping table because the outer hoop has been raised from the hooping table. The height of the edge 112 on which the outer hoop rests is determined by the height of the fabric to be hooped plus the height of backing fabric.

The multi-layered effect may be achieved by using a hoop alignment mechanism with two built-in layers or by using a hoop alignment mechanism with a single layer in combination with a detachable inner layer. A built in layer system is preferred for convenience of use.

When thin materials are to be hooped, such as t-shirts, the innacuracy caused by the placement of the outer hoop on the hooping table is negligible. However, when heavy materials such as sweatshirts are hooped, a hooper may be required to manually push the inner ring into perfect alignment with the outer ring—even after a hooping machine has been used.

Manual alignment of the hoops may contribute to fatigue and possibly injury. The use of multiple layers allows the person using a hooping machine to accurately align the inner hoop with the outer hoop, hooping heavy materials, without such extreme factors of fatigue and injury.

The hoop alignment mechanism 19 may be placed in many different places on the hooping table, depending on the article or garment to be hooped. Often it is desireable to place backing fabric over the hoop alignment mechanism before the second hoop is placed in the hoop alignment mechanism. The purpose of the backing fabric is to lend stability to the embroidery, as is well known in the art.

However, often when backing fabric is placed over the hoop alignment mechanism without being secured, and a garment or other article is placed over the hooping table, the backing fabric is often swept away from the hoop alignment mechanism by the garment.

To prevent this problem, the preferred hoop alignment mechanism employs a spring loaded backing attachment mechanism 84, which may, for example, comprise clips. The backing fabric is placed into the clips before the article is placed over the hooping table. Upon placing the garment over the hooping table, the backing fabric is held in place by the spring loaded backing attachment mechanism 84.

Figure 8:
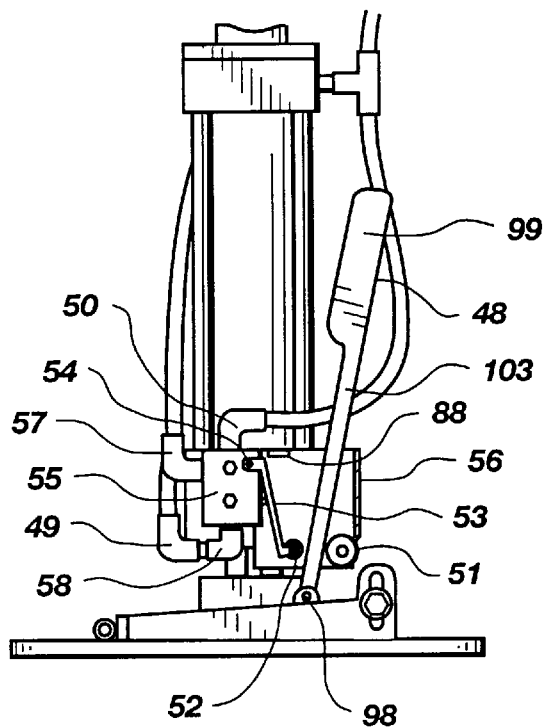
FIG. 8 features a cross section of the safety mechanism employed in the preferred embodiment, comprising a cam and an actuating mechanism. The cam is in an upper position leaving the actuating mechanism in an unactuated state.
Figure 9:
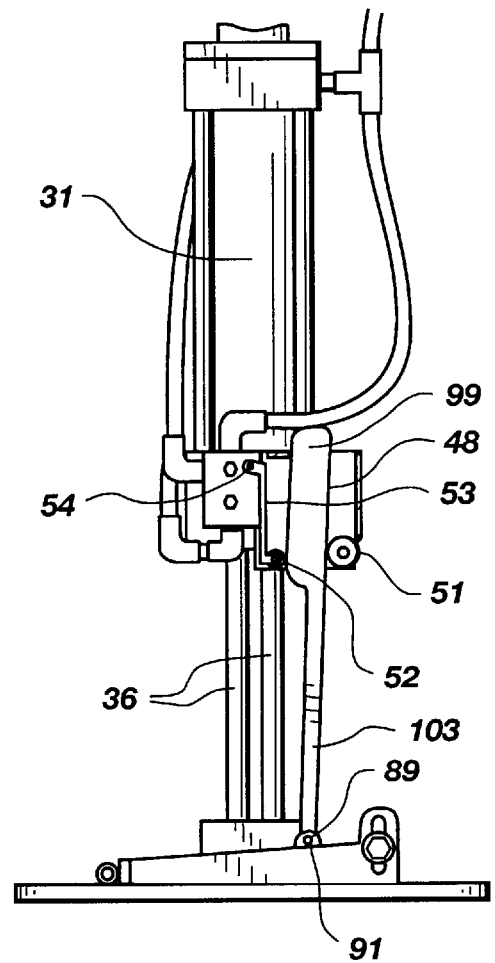
FIG. 9 features the cam in the preferred embodiment in a lower position, leaving the actuating mechanism in an actuated state.
Figure 10:
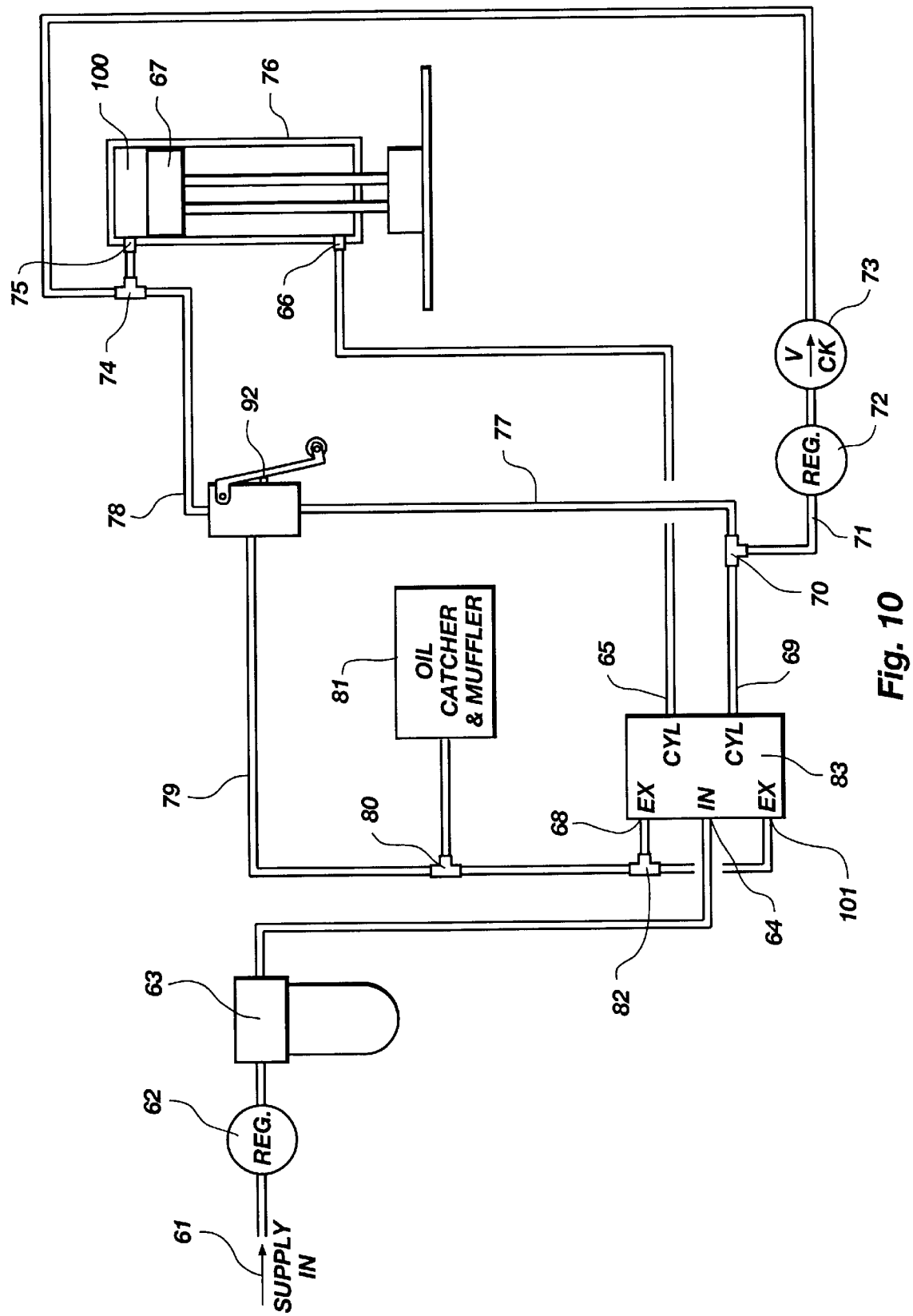
FIG. 10 features a schematic of the preferred mechanism for retracting and extending the ram bar. The schematic is merely representative of the system of hoses, regulators, valves, manifolds, safety mechanism, and other parts used which comprise the mechanism for retracting and extending the ram bar.

The piston 67 within the ram, the lower side of which is connected to the top side of at least one ram bar, is held in a retracted state within the cylinder housing 76 through the use of an air source originating initially in an air supply source 61. FIG. 8 demonstrates the view of the ram 31 when the piston 67 is in a retracted state. FIG. 9 demonstrates the view of the ram when the piston 67 is in an extended state.

Figure 5:
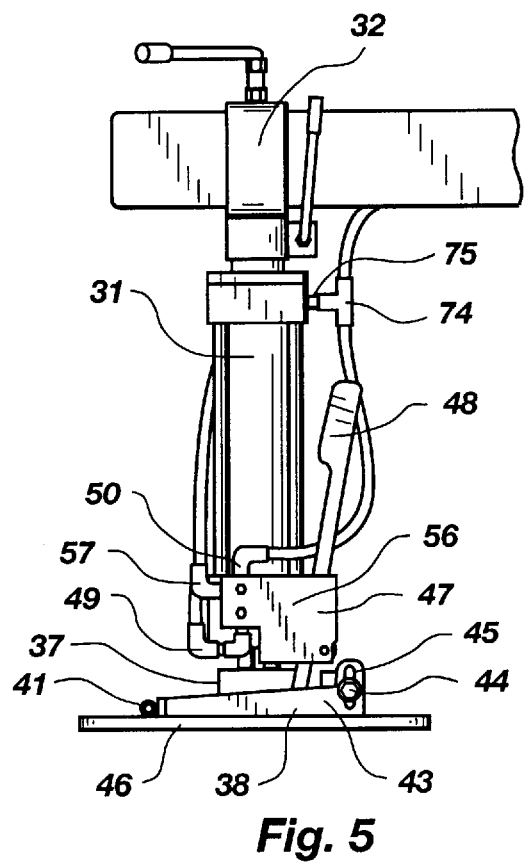
FIG. 5 features the ram of the preferred embodiment of the present invention comprising a pneumatic head, a safety feature, and an angle head. The angle head is featured in a horizontal or unangled state in FIG. 5.

FIG. 5 demonstrates the placement of the safety mechanism 47 on the bottom portion of the ram 31, which comprises a unique hallmark which may be and in the preferred embodiment is used in association with the present invention.

FIGS. 8 and 9 demonstrate the safety mechanism 47 in cross section. The safety mechanism 47 allows a hooper to lower the first hoop onto the second hoop using a powerful pneumatic ram with a safety mechanism, preventing injuries to fingers and other appendages.

The safety mechanism is comprised of a valve body 55, comprised of, for example, a two way valve, to which is attached a valve actuation arm 53. At the end of the valve actuation arm most distal to the valve body 55 is attached a valve actuation roller 52, while an arm pivot 54 is attached to the valve body 55 at the end of the actuation arm 53 most proximal to the valve body 55. An actuation button 92 is attached to the valve body 55 under the actuation arm 53, and is actuated by the movement of the actuation arm toward the valve body. FIG. 8 demonstrates the safety mechanism in the unactuated state, while FIG. 9 demonstrates the safety mechanism in the actuated state.

The MV2-C Roller Leaf, for example, sold by "air-mite," Chicago, Ill., is comprised of a two-way valve body, arm pivot, valve actuation arm, valve actuation roller, and an actuation button and works well in combination with the other features of the present invention.

In the preferred embodiment, the safety mechanism which may comprise and preferably comprises a safety housing 56 which wraps around the essential components of the safety mechanism in a U shaped members. The safety housing 56 is connected to the lower portion of the ram 31 through the use of a safety mechanism attachment member comprising a front 102 and a side 105. The safety mechanism attachment member is preferably comprised of a bracket mounted on the ram through the use of a detachably mounted mounting mechanism. Preferably at least one and most preferably two bolts 104 bolt through ring shapes which define holes in the bracket into internal nuts in the ram. The preferred bracket is a bracket stretches over two sides of the of the four sided ram, has a 90° angle, and is slotted with ring shaped members defining holes for adjustment up and down the ram. The safety mechanism attachment member could also comprise a mounting mechanism, such as welded edges, screws, bolts, pins, or other devices commonly known in the art.

The safety mechanism 47 is mounted on the side of the safety mechanism attachment member 105 through the use of a mounting mechanism, preferably comprising two screws which screw through ring shapes defining holes in the safety housing 56, through ring shapes defining holes in the valve body, through ring shapes defining holes in opposite side of the safety housing 56 and into external nuts on the outside of the safety housing. Other mounting mechanisms are possible to mount the safety housing 56 to the ram 31, such as welding, soldering, screws, nuts and bolts, and the use of various pins.

The idler roller 51 is held in place through the use of a screw extending through a ring shape in the safety housing defining a hole, through a ring shape in the idler roller defining a hole, through another ring shape in the opposite side of the safety housing defining a hole, into an external lock nut. Pins and screws and other mounting mechanisms would also be available to mount the idler roller.

In the present invention, the lower end of a cam 48 is attached to the first plate 39 through the use of a cam attachment mechanism 98, such as a mounting mechanism. Preferably, the cam attachment mechanism is comprised of at least a first raised protuberance 89, and in the preferred embodiment, a plurality of raised protuberances, extending upwardly from the first plate 39. Component 90 is an example of a second raised protuberance. Furthermore, in the preferred embodiment, the lower end of the cam 48 has a ring-shape defining a hole therethrough 91, through which a screw is threaded. The screw is also threaded through the protuberances 89, 90 and is secured with a nut. In the most preferred embodiment, the screw is loosely threaded and the cam's ring-shape defining a hole which is large enough to allow for some play between the ring shape and the screw.

By being loosely engaged, the cam prevents false openings. The hinge pin is not welded solid to first plate because such a rigid attachment could cause unintended actuations of the actuation button 92. By having the cam pivot, it floats downward rather than being rigid, opening only when the ram is extended to the desired position.

When the first plate 39 is lowered, the secured cam is lowered, stabilized by the idler roller 51. When the cam 48 is lowered, as in FIG. 9, to a point in which the widened cam flange 99 contacts the valve actuation roller 52, the valve is actuated allowing a gas, such as air, to flow from the two-way valve intake port elbow 58, which threads into internal threads in the two-way valve intake port, through the two way valve outlet port which has internal threads and into which is threaded the two-way valve outlet port elbow 50, allowing high pressure gas to flow through the two-way valve into the pneumatic cylinder 100, forcing the piston into an extended position using high pressure gas and lowering the angle head 38 the full distance needed to align the first and second hoop.

Thus, lowering the angle head 38 a certain distance, using pneumatic pressure or other pressure mechanisms, activates the lowering of the angle head to a greater distance. In the event the widened cam flange 99 is prevented from reaching the valve actuation roller, the high pressure gas is not emitted into the pneumatic cylinder 100, and the angle head 38 does not proceed downwardly at a high pressure. Instead a low pressure force continues.

Thus if an object, such as a finger is trapped between the hoop alignment mechanism 19 and the push plate, preventing the widened cam flange 99 from reaching the valve actuation roller 52, only low pressure gas is applied against the finger.

The use of the safety mechanism 47 in combination with a pneumatic ram is a significant and innovative contribution to the art. The many other safety and functional mechanisms associated with the pneumatic ram provide for a safe, powerful and effective means to hoop articles of manufacture.

In the most preferred embodiment, the safety mechanism 47 is provided with an false actuation prevention device 88. The false actuation prevention device prevents the cam shaft 103 from actuating the actuating button by striking the valve actuation roller 52 with the cam shaft when the shaft is moved or toggled. The false actuation prevention device is strategically located to the block the cam shaft 103 from striking the valve actuation roller 52 until the widened cam flange 99 reaches the valve actuation roller 52.

The false actuation prevention device is preferably comprised of a piece of steel and is connected to the safety housing through the use of a mounting mechanism. The preferred mounting mechanism is a welding of the two edges of the piece of steel onto opposite sides of the safety housing, forming a bridge between the two sides. The false actuation prevention device could also comprise a bolt, screw or pin mounted to both sides of the U shaped safety housing, forming a bridge. The false actuation device is an example of a means for preventing the false actuation of the high pressure valve system when the cam shaft is toggled.

One skilled in the art will recognize that there are many different means for retracting and extending the ram bar. The following discloses the preferred means for retracting and extending the ram bar using a system of pneumatic hoses and regulators.

In order to control the angle head without a hooper having to use at least one of his hands, a spring loaded foot pedal 60, attaching to a four way valve manifold system 83 is provided. Safety may be further enhanced by the provision of a foot pedal cover 59. The foot pedal is mounted to the base plate through the use of a mounting mechanism, preferably three bolts bolted to the base plate.

When the spring loaded foot pedal 60 is left in the elevated state, compressed gas, such as air, is provided from a supply inlet 61 through a regulator 62, through an automatic lubrication system 63 to the supply port 64 of a manifold 83, comprised of a four way valve, through a cylinder port retraction line 65 into a ram retraction port, 66 forcing the piston into a retracted state and consequently forcing the angle head into the up position as shown in FIG. 8.

When the foot pedal is depressed, the gas coming into the manifold 83 is routed through a cylinder port extension line 69 to a first T 70 which separates the air into two main extension lines.

The air in the first extension line 71 passes through a second regulator 72 which reduces the pressure. In the most preferred embodiment the pressure is reduced to approximately 20 pounds per square inch. The air in this first extension line then passes through a check valve 73, then continues to second T 74 and through the extension port 75 into the pneumatic cylinder 100, extending the piston, lowering the angle head, along with the cam 48. The air in the second extension line 77 passes through an elbow joint 49 into the two-way intake port, where it is prevented from progressing unless the actuation button 92 is actuated. If the widened cam flange 99 depresses the valve actuation roller 52, actuating the actuation button 92, high pressure gas flows through the two-way valve intake port elbow 58 which threads into internal threads in the two-way valve intake port, through the two-way valve exit port into which an elbow 50 is threaded and into the third extension line 78, into the second T 74, and eventually into the cylinder 100, extending the piston 67, and as a result, the angle head 38 with high pressure. The check valve 73, prevents the loss of high pressure air into the portion of the first extension line 71 preceding the check valve 73.

Depression of the foot petal also exhausts air through the ram retraction port 66, through the cylinder port retraction line 65, through the first manifold exit exhaust port 68, through the fourth T 82, through the third T 80 and into the canister 81 comprising an air muffler and an oil catcher.

When the foot pedal is released, the foot pedal raises to its up position, and air is exhausted through the two-way valve exhaust port elbow which threads into internal threads in the two-way valve exhaust port 57, into the extension line exhaust 79, through the third T 80 and into a canister 81 comprising an air muffler and an oil catcher. Air is also exhausted through the first extension line 71, into the cylinder port extension line 69, through the manifold exit exhaust port 101, through the fourth T 82, through the third T 80, and into the canister 81.

One skilled in the art will note that the ranges of the low and high pressures are determined by a number of factors including the fabric to be hooped, the parts used, the ram employed, the regulators used, and what pressures the parts are rated for.

The combination of the cam 48 and the valve body 55 thus comprise a means activated by the low pressure for activating the higher pressure unless the lower pressure meets with resistance.

The lowest range of the low pressure is determined essentially by the pressure necessary to make the widened cam flange come in contact with the valve actuation roller and the speed desired for the movement of the ram bar from the retracted position to the extended position. The highest range of the low pressure is whatever pressure will allow the fastest movement of the ram bar without significantly damaging fingers or other appendages which may become caught between the first ring and the second ring. When using the Speed Aire Non Rotating Rod Air Cylinder, the range of the low pressure desired in the hoses after the second regulator 72 is preferably approximately 5 p.s.i. to approximately 40 p.s.i., with 20 p.s.i. as a most preferred range. These ranges are not limiting upon the scope of the invention because the actual ranges to be considered are the pressures necessary to extend the ram bar (or preferably ram bars), yet not significantly injure an appendage.

The lowest range of the high pressure is determined by what pressure is necessary to press an inner hoop and outer hoop into alignment. The highest range of the high pressure is determined by the highest pressure for which the components in the pneumatic system such as the regulators, the check valve, the four way and two way valves, and the ram are rated for. The high pressure should not exceed what these parts are rated for.

In addition, the high pressure should not exceed what the fabric or material to be hooped can withstand. Many fabrics, such as cottons, as susceptible to hoop burn if too high of pressures are employed in hooping. Other fabrics, such as nylon may withstand greater pressures without damage.

When cottons are hooped, a pressure between approximately 50 to approximately 250 p.s.i. is the pressure on the push plate which is preferred. The amount of pressure on the push plate is determined by the amount of pressure in the pneumatic hose system and the ram used.

When using the Speed Aire Non Rotating Rod Air Cylinder, pressures between approximately 45 p.s.i. to approximately 150 p.s.i. are contemplated as being suitable as the pressure to be used after the air passes the first regulator 62 and the first T 70. The preferred ranges of high pressure are 80 to 120 p.s.i. with 80 p.s.i. being the most preferred for high pressure when cotton fabrics are hooped. However, these ranges are not limiting upon the scope of the invention because the actual ranges to be considered are factors of the equipment used, the ram used, and the fabric to be hooped.

While a pneumatic system is the preferred system for operating the machine, since the system of hoses and valves used to operate the machine is the same as or substantially similar to a system to be used in operating a hydraulic cylinder, one could readily convert this machine to a hydraulic hooping machine, employing a hydraulic cylinder rather than a pneumatic cylinder, yet still comprising the machine's unique safety mechanism, angle head and/or modulatable tables and guidance devices.

One skilled in the art will recognize that a push plate is secured to the ram for receiving and maintaining a first hoop in a desired set position, the first hoop defining a plane and a hooping table is mounted to the support frame, the hooping table being adapted to receive and maintain a corresponding second hoop in a desired set position, the second hoop defining a plane.

The angle head includes offsetting plates for maintaining the plane of the second hoop in an intersecting relationship with the plane of the first hoop.

One skilled in the art could also readily would the preferred embodiment of this invention into an electric hooping machine or a mechanically driven hooping machine. The machine's unique features such as the safety mechanism, angle head and/or modulatable tables and hoop alignment mechanism could be used in conjunction with many different means for extending and retracting the ram and as a result, the push plate. The push plate could be lowered and raised mechanically, electrically, through gas driven mechanisms, or through other devices to extend the bar on which the mounting block or first plate is mounted.

One skilled in the art will readily recognize that reference to the safety mechanism 47 refers to a safety means activated by the low pressure which activates the high pressure unless the lower pressure meets with resistance.

Furthermore, while the specification often refers to air as the gas to be used in the pneumatic hooping machine, this characterization is not to be limiting. Gases which may be used in the system comprise compressed air, nitrogen, argon, helium, and other inert gases.

Finally, the disclosure of the machine as a hooping machine is not intended to limit its use to meshing hoops together. The machine is useful for combining any items which must be meshed or aligned. Thus, the machine has applications such as the silk screen industry in which screens must be meshed.

The use of the term inner hoop is considered to be synonymous with the phrase male hoop while female hoop is considered to refer to the outer hoop.

The invention may be embodied in other specific forms without departing from its spirit or essential characteristics.

The described embodiments are to be considered in all resects only as illustrative and not as restrictive. The scope of the invention is, therefore, to be indicated by the appended claims rather than by the foregoing descrition. All changes which come within the meaning and scope of the claims are to be embraced within their scope.

What is claimed and desired to be secured by United States Letters Patent is:

1. An apparatus for mechanically combining corresponding male and female hoops as support members, the members maintaining a portion of fabric in a stretched, taut position, the apparatus comprising:

a vertically oriented support frame;

a ram slidably mounted within a ram housing that is attached to the support frame;

means secured to the ram for receiving and maintaining a first hoop in a desired set position;

a hooping table mounted to the support frame, the hooping table being adapted to receive and maintain a second corresponding hoop in a desired set position; and low pressure means for extending the ram from said ram housing a certain distance toward said hooping table;

high pressure means for extending said ram further toward said hooping table after said ram has been extended said certain distance, wherein said high pressure means is in fluid communication with said ram only after said ram has been extended said certain distance, and wherein said low pressure means communicates with said ram independently from said high pressure means while extending said ram said certain distance; and means associated with said low pressure means for activating said high pressure means after said ram has been extended said certain distance, such that resistance preventing said low pressure means from extending said ram said certain distance prevents the fluid communication of said high pressure means with said ram, thereby preventing injury to an operator;

wherein the means secured to the ram for receiving and maintaining a first hoop in a desired set position comprises a first plate connected to the ram;

a second plate;

a hinge connecting the first plate to the second plate; and means on the bottom surface of the second plate for receiving and maintaining the first hoop in a desired set position, the first hoop defining a plane, wherein the second hoop defines a plane, and wherein the apparatus further comprises:

spring loading means for initially maintaining the plane of the first hoop at an angle with respect to the plane of the second hoop;

such that upon compression of the spring loading means the plane of the second hoop is maintained in an intersecting relationship with the plane of the first hoop.

2. The apparatus in claim 1, wherein the low pressure means comprises a low pressure valve system and wherein the high pressure means comprises a high pressure valve system.

3. The apparatus as in claim 2, wherein said means for activating said high pressure means comprises:

a two-way valve having a pivotable valve actuation arm attached to said ram housing, and a cam means attached to said ram for pivoting said valve actuation arm as said ram is extended from said ram housing.

4. An apparatus, as in claim 1, wherein the means secured to the ram for receiving and maintaining a first hoop in a desired set position comprises a plate, the plate having a means for securing the first hoop to the plate.

5. An apparatus, as in claim 3, wherein the means secured to the ram for receiving and maintaining a first hoop in a desired set position comprises a plate, the plate having a means for securing the first hoop to the plate, wherein the cam means is attached to the plate and a roller is mounted on said valve actuation arm, such that said cam means contacts said roller and thereby pivots said valve actuation arm when said ram is extended said certain distance.

6. An apparatus, as in claim 4, further comprising at least one guidance means for aligning the plate according to a landmark on the fabric.

7. An apparatus, as in claim 6, wherein the guidance means comprises a laser.

8. The apparatus in claim 1, wherein the hooping table includes proximal and distal ends and has a rounded, beveled protuberance in the distal end which tapers proximally in an asymmetric pattern, substantially simulating the pattern of a head and shoulders.

9. The apparatus as in claim 1, wherein the apparatus includes hoop aligning means on the hooping table for maintaining the second hoop in the desired set position for precision alignment with the corresponding first hoop, the second hop having a plane, the hoop aligning means maintaining the second hoop in the desired set position above the hooping table as the first hoop is combined with the second hoop, thereby providing a space between the hooping table and the plane of the second hoop and enabling part of a fabric to extend into the space when the first and second hoops are combined.

10. An apparatus, as in claim 9, wherein the hoop aligning means includes attaching means for holding a backing fabric.

11. An apparatus as in claim 9, wherein the hoop aligning means is multilayered, allowing an individual operating the machine to bring the first hoop and the corresponding second hoop into alignment when thick fabrics are to be hooped.

12. An apparatus, as in claim 1, wherein the push plate is comprised of a transparent plastic.

13. An apparatus as in claim 12, wherein the transparent plastic is an acrylic sheet.

14. An apparatus, as in claim 12, wherein the plate comprises a push plate and wherein the push plate further comprises:

push plate gripping means for securing the first hoop to the push plate; and a hoop flange holding pin for holding multiple varieties of corresponding hoops.

15. The pneumatic hooping machine, as in claim 1, further comprising:

a horizontal support member for pivotally connecting the ram and ram housing to the vertical support frame.

16. An apparatus, as in claim 15, further comprising a collar slidably mounted on the horizontal support member, the collar securing the ram thereto.

17. An apparatus, as in claim 16, further comprising first locking means mounted on the collar for preventing the ram from sliding during operation.

18. An apparatus as in claim 1, wherein the ram and ram housing are rotatable through 360° about a vertical axis.

19. An apparatus, as in claim 18, further comprising second locking means for preventing the ram from rotating during the operation of the apparatus.

20. An apparatus, as in claim 1, wherein
   the low pressure means comprises a low pressure valve system;
   the high pressure means comprises a high pressure valve system; and
   the means associated with said low pressure means comprises
      a valve body having a plurality of valves attached to said ram housing;
      a cam connected to said ram, said cam comprising a shaft connected to a flange, the flange actuating the high pressure valve system when the ram is extended by the low pressure valve system; and
   means for preventing the actuation of the high pressure valve system when the cam shaft is toggled.

21. An apparatus, as in claim 1, further comprising:
   at least one alignment arm detachably mounted on the vertical support frame, the arm comprising:
      at least one pivoting joint; and
      a plurality of gripping members.

22. An apparatus as in claim 1, wherein the first hoop is a male hoop and the second hoop is a female hoop and wherein the fabric is maintained between the male and female hoops.

23. An apparatus as in claim 1, wherein the ram is selected from the group consisting of a pneumatic ram and a hydraulic ram.

24. An apparatus for mechanically combining corresponding male and female hoops as support members, the members maintaining a portion of fabric in stretched, taut position, the apparatus comprising:
   a vertically oriented support frame;
   a ram mounted to the support frame;
   means for extending the ram;
   a first plate connected to the ram;
   a second plate;
   a hinge connecting the first plate to the second plate;
   means on a bottom surface of the second plate for receiving and maintaining a first hoop in a desired set position, the first hoop defining a plane;
   a hooping table mounted to the support frame, the hooping table being adapted to receive and maintain a corresponding second hoop in a desired set position, the second hoop defining a plane; and
   spring loading means for initially maintaining the plane of the first hoop at an angle with respect to the plane of the second hoop;
   such that upon compression of the spring loading means the plane of the second hoop is maintained in an intersecting and parallel relationship with the first hoop.

25. An apparatus as in claim 24, wherein the means on a bottom surface of the second plate for receiving and maintaining a first hoop in a desired set position comprises a push plate.

26. An apparatus, as in claim 25, wherein the push plate is comprised of a transparent plastic for receiving and maintaining the corresponding hoop.

27. An apparatus as in claim 26, wherein the transparent plastic is an acrylic sheet.

28. An apparatus, as in claim 26, wherein the push plate further comprises:
   push plate gripping means for securing the first hoop to the push plate; and
   a hoop flange holding pin for holding multiple varieties of corresponding hoops.

29. An apparatus, as in claim 25, further comprising at least one guidance means for aligning the push plate according to a landmark on the fabric.

30. An apparatus, as in claim 29, wherein the guidance means comprises a laser.

31. An apparatus, as in claim 25, wherein the means for extending and retracting the pneumatic ram is actuated by a foot pedal.

32. The apparatus in claim 24, wherein the hooping table includes proximal and distal ends and has a rounded, beveled protuberance in the distal end which tapers proximally in an asymmetric pattern, substantially simulating the pattern of a head and shoulders.

33. The apparatus as in claim 24, wherein the apparatus includes hoop aligning means on the hooping table for maintaining the second hoop in the desired set position for precision alignment with the corresponding first hoop, the second hoop having a plane, the hoop aligning means maintaining the second hoop in the desired set position above the hooping table as the first hoop is combined with the second hoop, thereby providing a space between the hooping table and the plane of the second hoop and enabling part of a fabric to extend into the space when the first and second hoops are combined.

34. An apparatus, as in claim 33, wherein the hoop aligning means includes attaching means for holding a backing fabric.

35. An apparatus as in claim 33, wherein the hoop aligning means is multilayered, allowing an individual operating the machine to bring the first hoop and the corresponding second hoop into alignment when thick fabrics are to be hooped.

36. The pneumatic hooping machine, as in claim 24, further comprising:
   a horizontal support member for pivotally connecting the ram to the vertical support frame.

37. An apparatus, as in claim 36, further comprising a collar slidably mounted on the horizontal support member, the collar securing the ram thereto.

38. An apparatus, as in claim 37, further comprising first locking means mounted on the collar for preventing the ram from sliding during operation.

39. An apparatus as in claim 24, wherein the ram is mounted so as to be rotatable through 360°.

40. An apparatus, as in claim 39, further comprising second locking means for preventing the ram from rotating during the operation of the machine.

41. An apparatus, as in claim 24, further comprising:
   an alignment arm detachably mounted on the vertical support frame, the arm comprising:
      at least one pivoting joint; and
      a plurality of gripping members.

42. An apparatus, as in claim 24, the ram further comprising safety means for preventing injury to the operator.

43. An apparatus as in claim 24, wherein the first hoop is a male hoop and the second hoop is a female hoop and wherein the fabric is maintained between the male and female hoops.

44. An apparatus as in claim 24, wherein the means on a bottom surface of the second plate for receiving and maintaining a first hoop in a desired set position comprises a means for securing the first hoop to the second plate.

45. An apparatus as in claim 24, wherein the ram is selected from the group consisting of a pneumatic ram and a hydraulic ram.

46. An apparatus for mechanically combining corresponding male and female hoops as support members, the members maintaining a portion of fabric in a stretched, taut position between the members, the apparatus comprising:

a vertically oriented support frame;

a ram mounted to the support frame;

means for extending the ram;

a first plate connected to the ram;

a second plate;

a hinge connecting the first plate to the second plate;

means on a bottom surface of the second plate for receiving and maintaining a first hoop in a desired set position, the first hoop defining a plane;

a hooping table mounted to the support frame, the hooping table having a horizontal axis, the hooping table being adapted to receive and maintain a corresponding second hoop in a desired set position, the second hoop defining a plane; and spring loading means disposed between the first and second plates for initially maintaining the plane of the first hoop at an angle with respect to the horizontal axis of the hooping table.

47. An apparatus as in claim 46, wherein the second plate is selectively operable in: (i) an angled position wherein the plane of the first hoop is at an angle with respect to the plane of the second hoop; and (ii) a horizontal position wherein the plane of the first hoop is parallel to the plane of the second hoop.

48. An apparatus as in claim 47, wherein the second plate is in the angled position when the first hoop initially contacts the second hoop and wherein the second plate is compressed toward the first plate as the first hoop is combined with the second hoop.

49. An apparatus as in claim 46, wherein the spring loading means is comprised of a spring disposed between the first and second plates.

50. An apparatus as in claim 49, wherein the first plate further comprises a spring tower and wherein the spring is disposed at one end of the spring within the spring tower.

51. An apparatus as in claim 50, wherein the spring is compressed within the spring tower when the plane of the first hoop is in an intersecting relationship with the plane of the second hoop.

52. An apparatus as in claim 46, wherein the first hoop is a male hoop and the second hoop is a female hoop.

53. An apparatus as in claim 46, wherein the ram is selected from the group consisting of a pneumatic ram and a hydraulic ram.

54. An apparatus for mechanically combining corresponding male and female hoops as support members, the members maintaining a portion of fabric in a stretched, taut position between the members, the apparatus comprising:

a vertically oriented support frame;

a ram mounted to the support frame;

means for extending the ram;

means for coupling a first hoop to the ram, the first hoop defining a plane; and a hooping table mounted to the support frame, the hooping table being adapted to receive and maintain a second hoop in a desired set position, the second hoop defining a plane; wherein the means for coupling the first hoop to the ram comprised of means for maintaining the plane of the first hoop at an angle with respect to the plane of the second hoop prior to the extension of the ram and for maintaining the plane of the first hoop in an intersecting and parallel relationship with the second hoop following the extension of the ram.

55. An apparatus as in claim 54, wherein the means for coupling the first hoop to the ram, comprises means for initially lowering a portion of the first hoop into a portion of the second hoop and for thereafter lowering a remainder of the first hoop into a remainder of the second hoop, following the contours of the second hoop.

56. An apparatus as in claim 54, wherein the means for coupling the first hoop to the ram comprises an angle head having a first plate, a second plate, a hinge connecting the first plate to the second plate, and a spring disposed between the first and second plates, the angle head being selectively operable in an angled position and a horizontal position.

57. An apparatus as in claim 56, wherein the means for coupling the first hoop to the ram, further comprises hoop securing means on a bottom surface of the second plate for receiving and maintaining the first hoop in a desired set position.

58. An apparatus as in claim 56, wherein the means for coupling the first hoop to the ram, further comprises a push plate on a bottom surface of the second plate for receiving and maintaining the first hoop in a desired set position.

59. An apparatus as in claim 54, wherein the first hoop is a male hoop and the second hoop is a female hoop.

60. An apparatus as in claim 54, wherein the ram is selected from the group consisting of a pneumatic ram and a hydraulic ram.

* * * * *